(12) United States Patent
Stumpfl

(10) Patent No.: US 6,870,672 B2
(45) Date of Patent: Mar. 22, 2005

(54) MOBILE PROJECTION SCREEN

(76) Inventor: Reinhold Stumpfl, Mitterweg 46, A 4701 Wallern (AT)

( * ) Notice: Subject to any disclaimer, the term of this patent is extended or adjusted under 35 U.S.C. 154(b) by 0 days.

(21) Appl. No.: 10/460,586

(22) Filed: Jun. 11, 2003

(65) Prior Publication Data

US 2003/0227675 A1 Dec. 11, 2003

Related U.S. Application Data

(60) Provisional application No. 60/388,181, filed on Jun. 11, 2002.

(51) Int. Cl.$^7$ .......................... G03B 21/56; A47B 97/04
(52) U.S. Cl. ........................................ 359/443; 248/465
(58) Field of Search ............................... 359/443, 461; 248/465, 479, 917

(56) References Cited

U.S. PATENT DOCUMENTS 3,041,032 A  *  6/1962  Wilcox ....................... 359/443

6,334,687 B1  *  1/2002  Chino et al. ................ 248/922

OTHER PUBLICATIONS

Da–Lite Screen Company, Inc., The Power in Presentation Products, 2001, USA.

Draper, Inc., Products for Visual Communication, 2002, USA.

The Screen Works, E–Z Fold & E–Z Fold II.

* cited by examiner

Primary Examiner—Christopher Mahoney
(74) Attorney, Agent, or Firm—Gardere Wynne Sewell LLP

(57) ABSTRACT

In varying embodiments, the present invention incorporates a combination of structures suitable for providing a lightweight and portable projection surface. In certain embodiments, the present invention includes a frame having four beams connected at the corners, with a collapsible brace at each corner, so that the frame can be collapsed for storage or transport. In certain embodiments, each beam may incorporate one or more collapsible inline braces in order to promote an even more compact profile when collapsed.

14 Claims, 6 Drawing Sheets

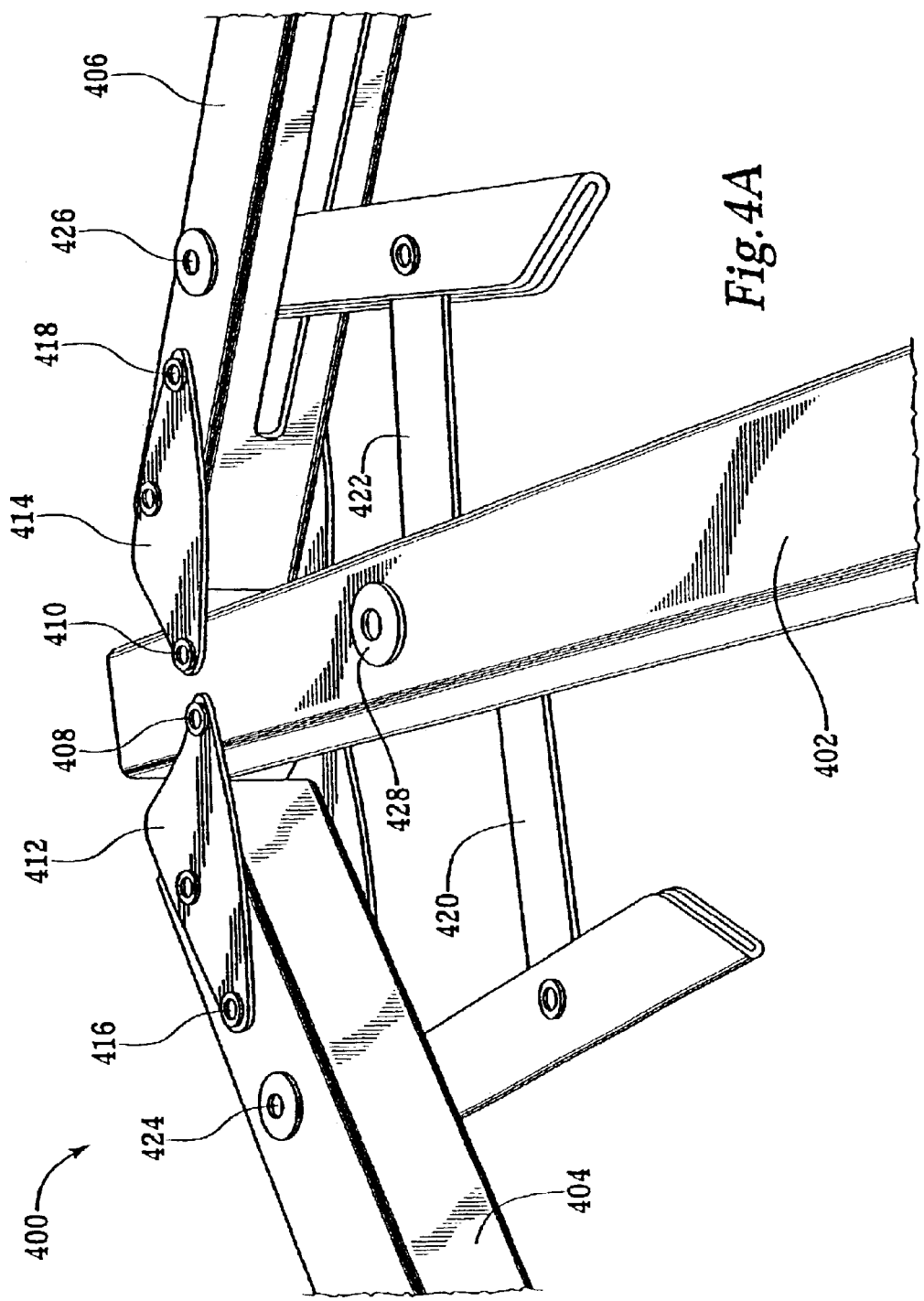

MOBILE PROJECTION SCREEN

This application claims priority to U.S. Application Ser. No. 60/388,181 filed on Jun. 11, 2002.

The present invention relates generally to media presentation, and specifically to a compact and highly-portable projection screen.

BACKGROUND OF THE INVENTION

Mobile projection screens were first developed in the late 1950s and early 1960s as an alternative to the large-format roller-type projection screens, which operated in the manner of a pull-down window shade. Although roller screens are somewhat portable in small sizes, there was and is a demand for larger size projection screens for use by staging and projection professionals in remote locations for events such as sales meetings, seminars, and entertainment.

Users needing a projection screen that was, for example, 14' long, which is not an uncommon size, would require a one-piece screen in a 14' long tube. A roller screen of this size was expensive to manufacture and difficult to ship and handle on-site in a temporary, non-permanent application.

As a consequence of the drawbacks found in the roller screens, an alternative product was developed using a frame constructed of 1" aluminum tube stock. The aluminum tube stock was cut in various lengths as required and a hinge was added. This hinge allowed the product to be folded into a smaller size, which could be assembled (unfolded) and disassembled (folded) as needed.

With this design, the user attached a PVC vinyl projection surface to the frame using matching male and female snaps, which were applied to both the folding frame and the folding PVC vinyl projection surface. This design reduced time of assembly in the field and reduced the overall shipping dimensions, which reduced the overall cost to provide professional projection at remote locations.

SUMMARY OF THE INVENTION

The mobile projection screen disclosed herein provides a unique combination of structures suitable for use with all forms of projection equipment. Using the teachings of the present invention, one of skill in the art will be able to readily construct a strong, lightweight projection screen able to be compactly stored and transported and easily assembled.

In one embodiment, the present invention includes a projection screen frame having a top beam, a bottom beam, and at least one connecting beam connecting the top beam to the bottom beam. Each beam is connected to each beam adjacent to it by a brace, having a pivot pin disposed in one of the adjacent beams, a pivot plate disposed to pivot around the pivot pin, one or more fasteners connecting the pivot plate to the remaining beam, and a connecting brace, connecting the adjacent beams.

In a second embodiment, the present invention includes a projection screen frame having a top beam, a bottom beam, and two side beams connecting the top beam to the bottom beam. Each beam is connected to each beam adjacent to it by a corner brace, having a pivot pin disposed in one of the adjacent beams, a pivot plate disposed to pivot around the pivot pin, one or more fasteners connecting the pivot plate to the remaining beam, and a connecting brace connecting the beams at points inside the pivot point. At least one beam has a pivotable inline brace disposed therein, separating the beam into two adjacent beam portions. The inline brace includes a pivot pin disposed in one of the adjacent beam portions, a pivot plate disposed to pivot around the pivot pin, one or more fasteners connecting the pivot plates to the remaining beam portion, and a latch, operable to latch the adjacent beam portions in an inline configuration.

In a third embodiment, the present invention comprises projection screen frame having a top beam, a bottom beam, and two side beams connecting the top beam to the bottom beam. Each beam is connected to each beam adjacent to it by a corner brace comprising a pivot pin disposed in one of the adjacent beams, a pair of pivot plates disposed to pivot around the pivot pin, one or more fasteners fixing the orientation of the pivot plates to the remaining beam, and a connecting brace connecting the beams at points inside the pivot point. At least one beam has a pivotable inline brace disposed therein, separating the beam into two adjacent beam portions. The inline brace includes a pivot pin disposed in one of the adjacent beam portions, a pair of pivot plates disposed to pivot around the pivot pin, one or more fasteners fixing the orientation of the pivot plates to the remaining beam portion, and a latch, operable to latch the adjacent beam portions in an inline configuration.

In a fourth embodiment, the present invention includes a projection screen frame having a top beam, a bottom beam, and two side beams connecting the top beam to the bottom beam. Each beam is connected to each beam adjacent to it by a corner brace having a pivot pin disposed in one of the adjacent beams, a pair of pivot plates disposed to pivot around the pivot pin, one or more fasteners fixing the orientation of the pivot plates to the remaining beam, and a connecting brace connecting the beams at points inside the pivot point. Each beam has at least one pivotable inline brace disposed therein, separating the beam into two adjacent beam portions. The inline brace has a pivot pin disposed in one of the adjacent beam portions, a pair of pivot plates disposed to pivot around the pivot pin, one or more fasteners fixing the orientation of the pivot plates to the remaining beam portion, and a latch, operable to latch the adjacent beam portions in an inline configuration.

BRIEF DESCRIPTION OF THE DRAWINGS

For more complete understanding of the features and advantages of the present invention, reference is now made to the detailed description of the invention along with the accompanying Figures.

FIG. 4A depicts a three-dimensional view of an unlocked T-brace according to certain embodiments of the present invention.

DETAILED DESCRIPTION OF THE INVENTION

While the making and using of various embodiments of the present invention are discussed in detail below, it should be appreciated that the present invention provides many applicable inventive concepts that may be embodied in a wide variety of specific contexts. The specific embodiments discussed herein are merely illustrative of specific ways to make and use the invention and do not delimit the scope of the invention. Various modifications and combinations of the illustrative embodiments, as well as other embodiments of the invention, will be apparent to persons skilled in the art upon reference to the description. It is therefore intended that the appended claims encompass any such modifications or embodiments.

Figure 1:
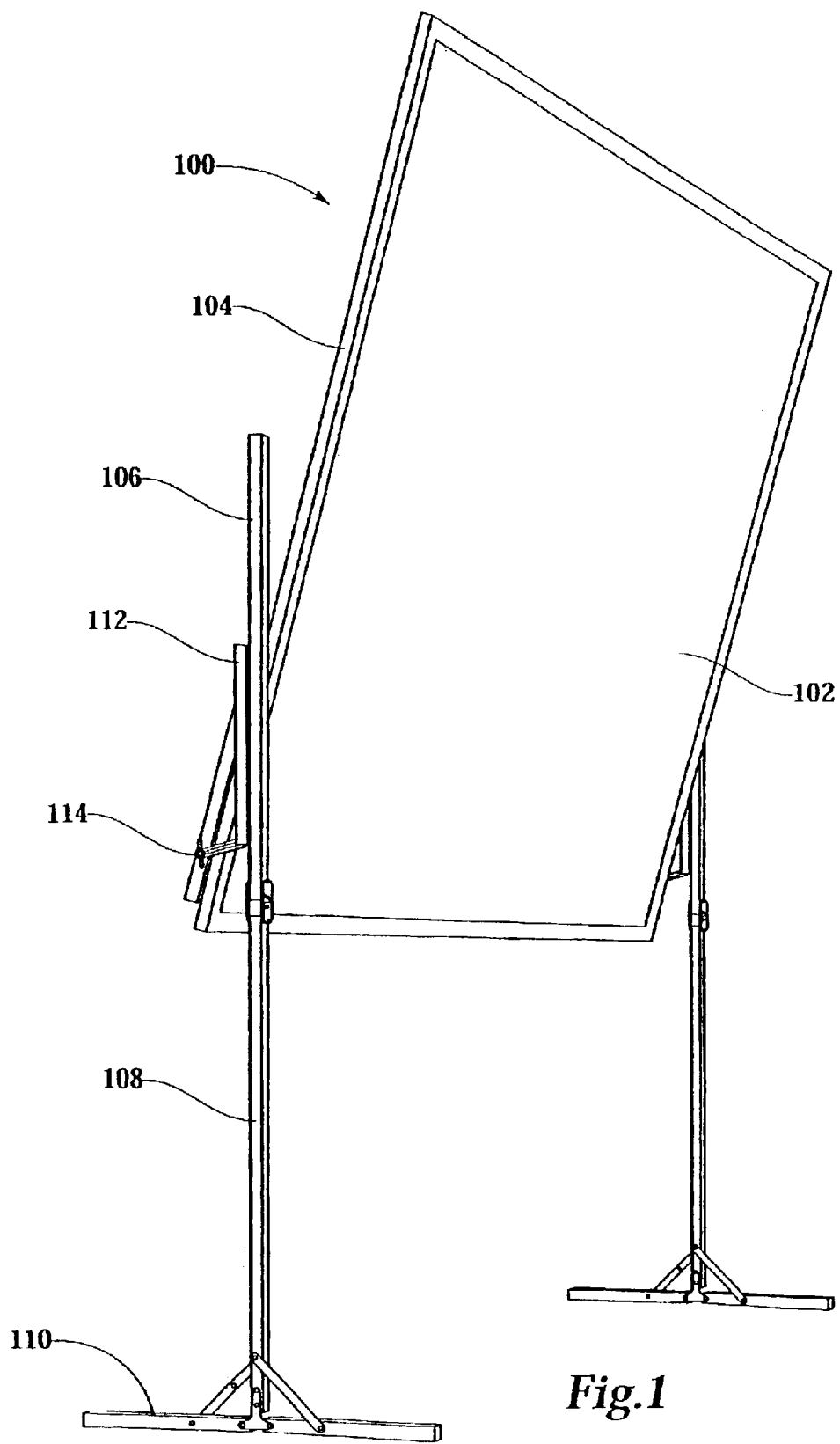
FIG. 1 depicts a three-dimensional view of an assembled projection screen according to one embodiment of the present invention.

FIG. 1 depicts a three-dimensional view of an assembled projection screen according to one embodiment of the present invention. As seen in FIG. 1, mobile projection screen assembly 100 includes a projection surface 102 mounted on a rectangular frame 104. The frame 104 is, in turn, affixed to a pair of mounts 106, each of which incorporates a vertical strut 108 and a horizontal base 110. In this embodiment, the frame 104 is connected to the mounts 106 at pivot points 112. The angle of the frame 104, and therefore the screen 102, with respect to the vertical struts 108 can be adjusted and fixed using adjustment mechanism 114.

Stability, weight and transport volume are all closely interrelated. To optimize packing dimensions, the frame 104 can be made from a number of different tube sizes. At least one embodiment uses tubing having a profile of 32 mm×32 mm square in cross-section. In certain embodiments, this tubing is extruded aluminum alloy with a weight of 0.6 kg/m. The 32 mm×32 mm profile tubing has been found suitable for all screen sizes up to at least 400×400 cm, 600×300 cm or 900×300 cm.

In another embodiment, the frame 104 is constructed of tubing having a cross-section of 64×32 mm. This tubing has been used successfully in frames as large as 500×340 cm and up. This size of tubing can also, of course, be used in smaller frames if the application requires additional strength or rigidity.

As explained in more detail below, Applicants have developed a novel way to integrate the corner braces of the frame 104 into the interior of the frame 104, rather than attaching it externally, as found in the prior art. This innovation has proved to be a significant enhancement to the overall performance of the device. This feature also facilitates the use of a folding projection surface 102 with square corners. This further enhances the performance of the device.

A second innovation of the present invention is the incorporation of pressure release push button self-latching inline hinges. Prior to Applicant's development and incorporation of this feature, the prior art used a locking hinge requiring at least two hands to latch in place. In certain embodiments, the frame 104 is designed to lock its hinges in place automatically as the frame 104 is pulled open. Using the novel aspects disclosed herein, a user can assemble and disassemble certain embodiments of frame 104 without any tools.

Figure 2:
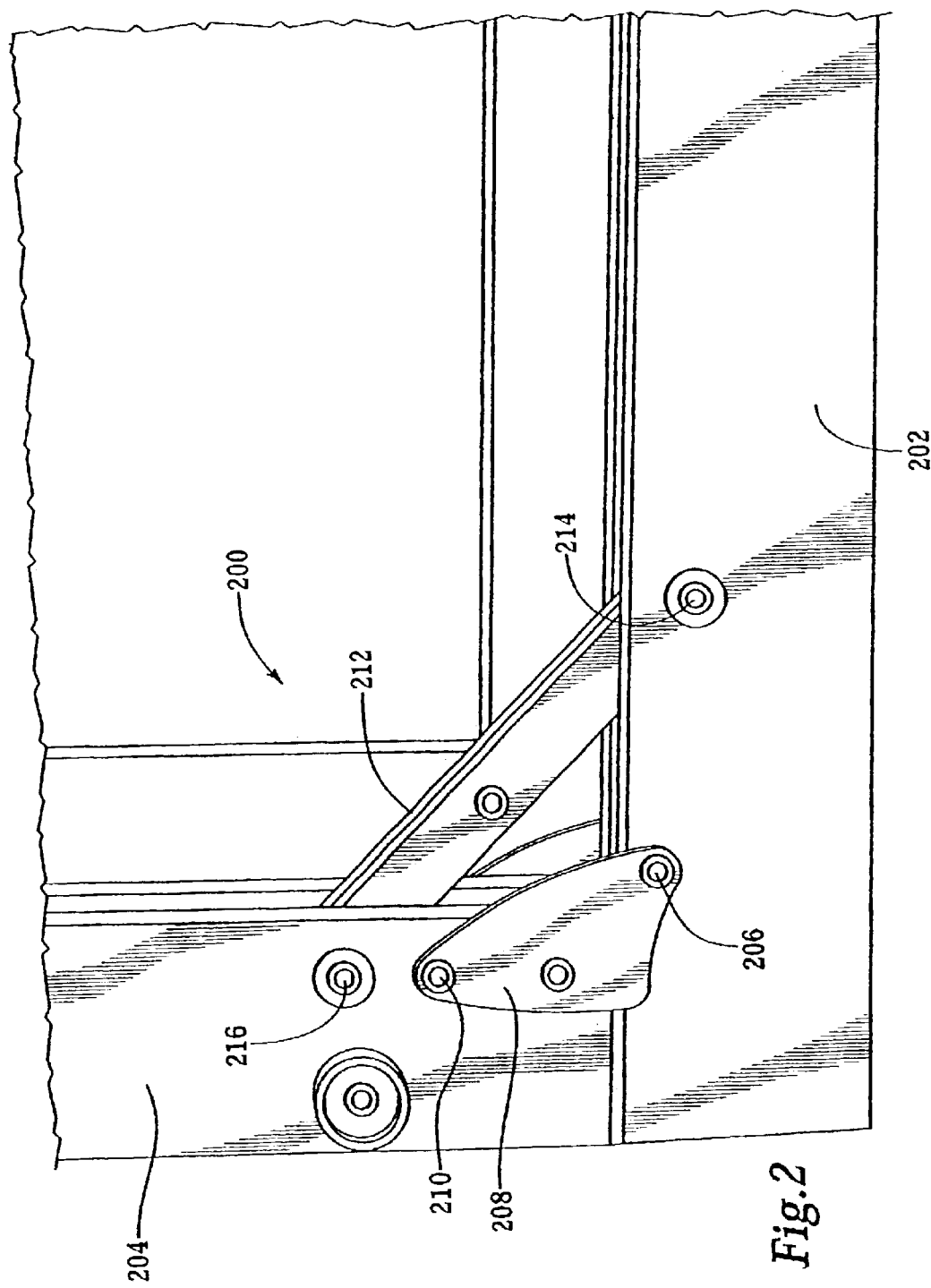
FIG. 2 depicts a front view of a locked corner brace of a mobile projection screen according to one embodiment of the present invention.
Figure 2A:
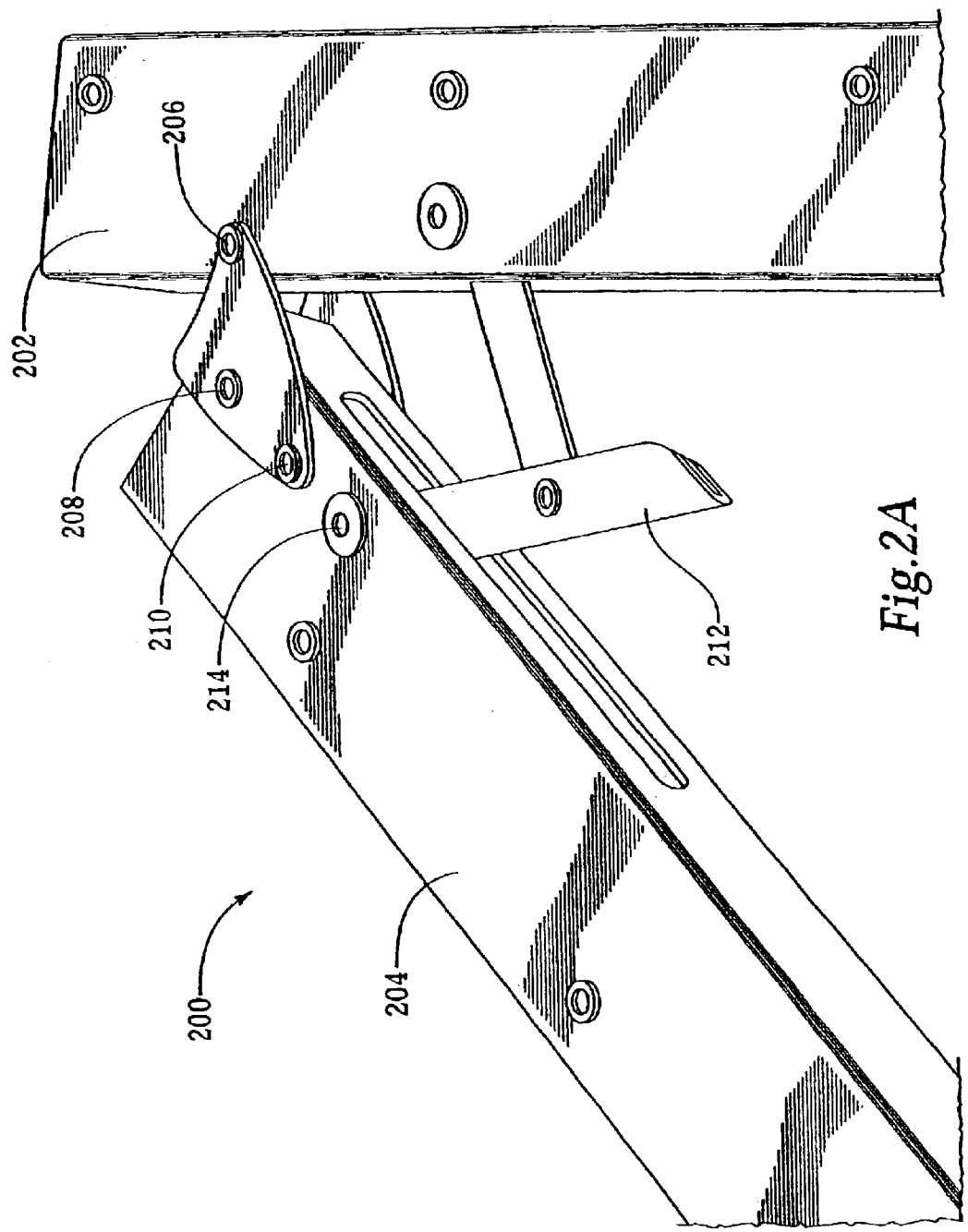
FIG. 2A depicts a rear view of an unlocked corner brace of a mobile projection screen according to one embodiment of the present invention.

FIG. 2 depicts a front view of a locked corner brace of a mobile projection screen according to one embodiment of the present invention. FIG. 2A depicts a rear view of an unlocked corner brace of a mobile projection screen according to one embodiment of the present invention.

Corner brace 200 is composed of a first beam 202 joined to a second beam 204 by a pivot pin 206 and a joint plate 208. Joint plate 208 is fastened to second beam 204 by fasteners 210. First beam 202 and second beam 204 are connected and reinforced by over-center brace 212, which is connected to first beam 202 by fastener 214, and to second beam 204 by fastener 216.

In certain embodiments, one or both of beams 202 and 204 of joint 200 may have a slot cut in the inside face of each, so as to accommodate the over-center brace 212 when the corner joint 200 is collapsed. In certain embodiments, one face of the beams 202 and 204 may incorporate snaps to facilitate attachment of a projection screen 102.

Figure 3:
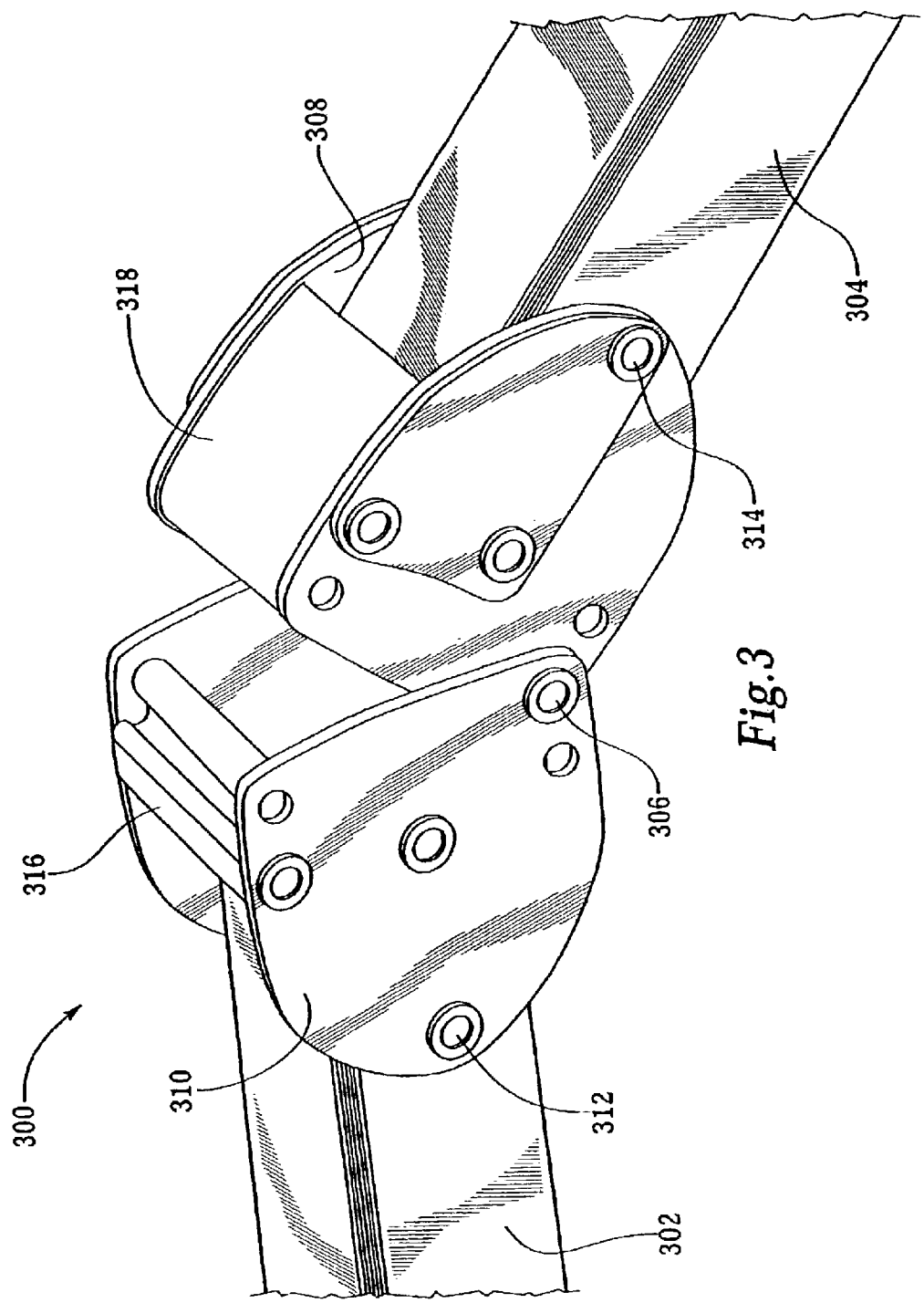
FIG. 3 depicts a three-dimensional view of an unlocked inline brace according to certain embodiments of the present invention.

FIG. 3 depicts a three-dimensional view of an unlocked inline brace according to certain embodiments of the present invention. Inline brace 300 connects a first beam 302 and a second beam 304, allowing them to pivot about pivot pin 306 unless latched.

First beam 302 and second beam 304 are connected to pivot pin 306 by inner latch plates 308 and outer latch plates 310, respectively. Inner latch plates 308 are connected to beam 304 by fasteners 314. Outer latch plates 310 are attached to beam 302 by fasteners 312.

In storage, the inline brace 300 will be left free to pivot about pivot pin 306 and will not be latched. In use, however, the inline brace 300 can be latched into a straight configuration, so that beam 302 and beam 304 are generally parallel and aligned to one another. This latching is accomplished using inner latch 316 and outer latch 318, which are designed to mate together and latch upon engagement. In certain embodiments, one or both of inner latch 316 and outer latch 318 may be spring-loaded. In certain embodiments, inner latch 316 and outer latch 318 are designed to automatically latch whenever beam 302 and beam 304 are aligned sufficiently to engage inner latch 316 and outer latch 318.

Figure 4:
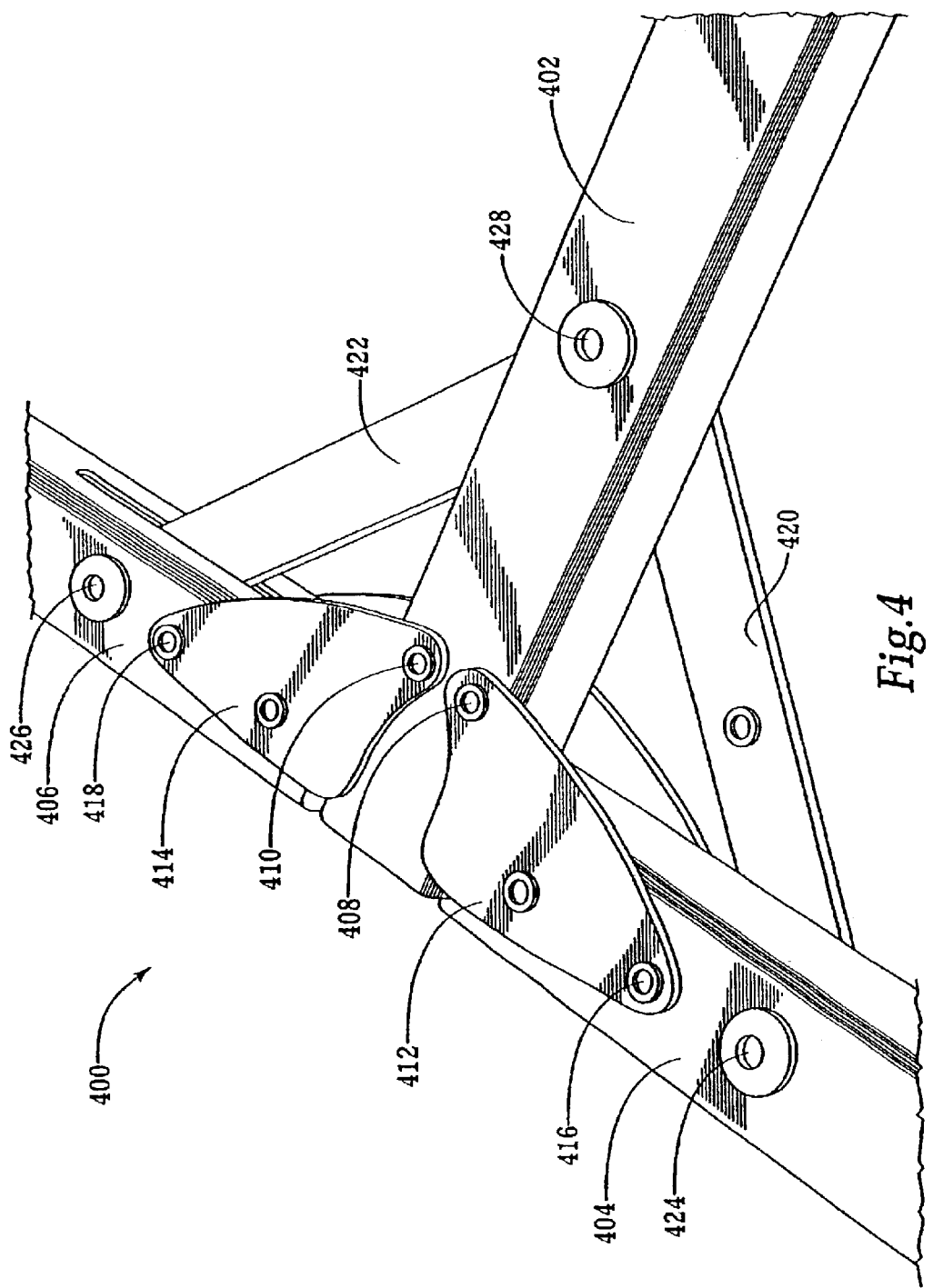
FIG. 4 depicts a three-dimensional view of a locked T-brace according to certain embodiments of the present invention.

FIG. 4 depicts a three-dimensional view of a locked T-brace according to certain embodiments of the present invention. FIG. 4A depicts a three-dimensional view of an unlocked T-brace according to certain embodiments of the present invention.

T-brace 400 connects central beam 402 to first transverse beam 404 and second transverse beam 406 through pivot pins 408 and 410, respectively. Pivot pins 408 and 410 are connected to transverse beams 404 and 406 by pivot plates 412 and 414 respectively. Pivot plates 412 and 414 are secured to transverse beams 404 and 406 by fasteners 416 and 418.

T-brace 400 is supported and stiffened by locking braces 420 and 422. Locking brace 420 braces the connection between central beam 402 and first transverse beam 404, while locking brace 422 braces the connection between central brace 402 and second transverse brace 406. In certain embodiments, either or both of locking braces 420 and 422 may be over-center locking braces.

Locking brace 420 is connected to transverse beam 404 by fastener 424 and to central beam 402 by fastener 428. Similarly, locking brace 422 is connected to transverse beam 406 by fastener 426 and to central beam 402 by fastener 428. In certain embodiments, central beam 402, transverse beam 404, and/or transverse beam 406 may incorporate a slot or pocket to accommodate the locking braces in the closed position.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A projection screen frame comprising:
a top beam, a bottom beam, and at least one connecting beam connecting the top beam to the bottom beam, each beam connected to each beam adjacent to it by a brace,
each brace comprising
a pivot pin disposed in one of the adjacent beams,
a pivot plate disposed to pivot around the pivot pin,
one or more fasteners connecting the pivot plate to the remaining beam, and
a connecting brace, connecting the adjacent beams.

2. A projection screen frame comprising:
a frame having a top beam, a bottom beam, and two side beams connecting the top beam to the bottom beam, each beam connected to each beam adjacent to it by a corner brace,
each corner brace comprising
a pivot pin disposed in one of the adjacent beams,
a pivot plate disposed to pivot around the pivot pin,
one or more fasteners connecting the pivot plate to the remaining beam, and
a connecting brace connecting the beams at points inside the pivot point;
at least one beam having a pivotable inline brace disposed therein, separating the beam into two adjacent beam portions, the inline brace comprising
a pivot pin disposed in one of the adjacent beam portions,
a pivot plate disposed to pivot around the pivot pin,
one or more fasteners connecting the pivot plates to the remaining beam portion, and
a latch, operable to latch the adjacent beam portions in an inline configuration.

3. A projection screen frame comprising:
a frame having a top beam, a bottom beam, and two side beams connecting the top beam to the bottom beam, each beam connected to each beam adjacent to it by a corner brace,
each corner brace comprising
a pivot pin disposed in one of the adjacent beams,
a pair of pivot plates disposed to pivot around the pivot pin,
one or more fasteners fixing the orientation of the pivot plates to the remaining beam, and
a connecting brace connecting the beams at points inside the pivot point;
at least one beam having a pivotable inline brace disposed therein, separating the beam into two adjacent beam portions, the inline brace comprising
a pivot pin disposed in one of the adjacent beam portions,
a pair of pivot plates disposed to pivot around the pivot pin,
one or more fasteners fixing the orientation of the pivot plates to the remaining beam portion, and
a latch, operable to latch the adjacent beam portions in an inline configuration.

4. A projection screen frame comprising:
a frame having a top beam, a bottom beam, and two side beams connecting the top beam to the bottom beam, each beam connected to each beam adjacent to it by a corner brace,
each corner brace comprising
a pivot pin disposed in one of the adjacent beams,
a pair of pivot plates disposed to pivot around the pivot pin,
one or more fasteners fixing the orientation of the pivot plates to the remaining beam, and
a connecting brace connecting the beams at points inside the pivot point;
each beam having at least one pivotable inline brace disposed therein, separating the beam into two adjacent beam portions, the inline brace comprising
a pivot pin disposed in one of the adjacent beam portions,
a pair of pivot plates disposed to pivot around the pivot pin,
one or more fasteners fixing the orientation of the pivot plates to the remaining beam portion, and
a latch, operable to latch the adjacent beam portions in an inline configuration.

5. The projection screen frame of claim 4 wherein the beam portions comprise a substantially-rectangular cross-section.

6. The projection screen frame of claim 5 wherein the major dimension of the substantially-rectangular cross-section is approximately 64 mm.

7. The projection screen frame of claim 5 wherein the minor dimension of the substantially-rectangular cross-section is approximately 32 mm.

8. The projection screen frame of claim 4 wherein the beam portions comprise a substantially-square cross-section.

9. The projection screen frame of claim 8 wherein the sides of the substantially- square cross-section measure approximately 32 mm.

10. The projection screen frame of claim 4 wherein at least one connecting brace is an over-center brace.

11. The projection screen frame of claim 4 wherein at least one beam has a slot disposed in the side thereof positioned and sized to accept at least a portion of a connecting brace.

12. The projection screen frame of claim 4 wherein at least one latch comprises an inner latch and an outer latch.

13. The projection screen frame of claim 12 wherein the outer latch is spring-loaded.

14. The projection screen frame of claim 12 wherein the inner latch is spring-loaded.

* * * * *